United States Patent Office
3,553,216
Patented Jan. 5, 1971

3,553,216
PROCESS FOR THE PRODUCTION OF CYTOSINE COMPOUNDS AND INTERMEDIATES FOR USE THEREIN
Leonard Doub, Bloomfield Hills, and Uldis Krolls, Ann Arbor, Mich., assignors to Parke, Davis & Company, Detroit, Mich., a corporation of Michigan
No Drawing. Continuation-in-part of application Ser. No. 476,694, Aug. 2, 1965. This application Mar. 4, 1968, Ser. No. 709,964
Int. Cl. C07d 51/28
U.S. Cl. 260—256.4
6 Claims

ABSTRACT OF THE DISCLOSURE

Process for the production of cytosines, optionally substituted in the 1-position by lower alkyl or benzyl, and salts thereof, by the dehydrohalogenation of a 5-halo-5,6-dihydrocytosine or a salt thereof. The unsubstituted product, cytosine, is useful as an intermediate in the preparation of cytidine and the 1-substituted cytosine products are useful as intermediates in the preparation of N-sulfanilylcytosines.

CROSS-REFERENCE TO RELATED APPLICATION

This application is a continuation-in-part of co-pending application Ser. No. 476,694, filed Aug. 2, 1965, now U.S. Pat. 3,375,247.

SUMMARY AND DETAILED DESCRIPTION

The present invention relates to a process for the production of cytosine compounds and to intermediates used therein. More particularly, the invention relates to a process for the production of cytosine compounds having the formula

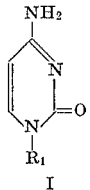

I and salts thereof by the dehydrohalogenation of a 5-halo-5,6-dihydrocytosine compound having the formula

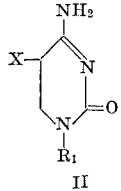

II or a salt thereof; where $R_1$ is hydrogen, lower alkyl, or benzyl, and X is bromine, chlorine, or iodine.

In accordance with the invention, the dehydrohalogenation process is carried out in a number of ways. In the first and preferred method, a 5-halo-5,6-dihydrocytosine compound having Formula II above, or a salt thereof, is reacted with a base in an unreactive solvent medium. Any of a variety of basic substances can be used, including alkali metal hydroxides, alkali metal alkoxides, tertiary amines, such as triethylamine and pyridine, ammonia (in absolute ethanol), lithium chloride (in dimethylformamide), and sodium acetate (in glacial acetic acid). Of these, the alkali metal hydroxides, especially potassium hydroxide, give the best results and are preferred. The reaction with base is most advantageously carried out in an unreactive solvent medium, which is preferably a lower alkanol when the preferred potassium hydroxide base is used. The temperature of the reaction may be varied over a wide range, from about 0° to about 150° C., depending on the basic reagent and solvent employed. With the preferred potassium hydroxide base in a lower alkanol solvent, the reaction can conveniently and readily be carried out at room temperature, that is, without external heating. The reaction can also conveniently be carried out at the reflux temperature of the reaction mixture. The duration of the reaction will naturally vary depending primarily on the temperature employed. Under the conditions described above the reaction is normally complete within a period of from 30 minutes to 3 hours. When the 5-halo-5,6-dihydrocytosine starting material is used in free base form, a molar equivalent of the basic reagent is used, and the cytosine product is obtained directly in free base form. When a salt of the 5-halo-5,6-dihydrocytosine is used as starting material, two molar equivalents of base are employed, and the cytosine product is again obtained as the free base.

The dehydrohalogenation reaction can also be carried out by heating a solution of the 5-halo-5,6-dihydrocytosine starting material in an unreactive solvent at an elevated temperature in the absence of any other reagent. The duration of heating will depend on the temperature employed. For example, a moderate-to-good yield of cytosine product is obtained when a solution of the 5-halo-5,6-dihydrocytosine in a lower alkanol solvent is heated under reflux for a period of from 16 to 20 hours. With a higher-boiling solvent, such as nitrobenzene, the reaction is essentially complete after the solution is heated at 150–170° C. for a period of from 10 to 30 minutes. The preferred starting material in this method of carrying out the dehydrohalogenation is a 5-bromo- or 5-iodo-5,6-dihydrocytosine hydrohalide salt. When this starting material is used, the cytosine product is obtained directly as a hydrohalide salt, and can be isolated as such or converted to the free base by adjustment of the pH as required.

For the preparation of the unsubstituted product, cytosine, the preferred starting material is 5-chloro-5,6-dihydrocytosine or a salt thereof.

The 5-halo-5,6-dihydrocytosine compounds having Formula II that are used above as starting materials have not been known heretofore and form part of the present invention. They are prepared in a number of ways, as described in greater detail hereinafter. The simplest and most direct method for the preparation of the 1-substituted-5-halo-compounds is the reaction of a 5,6-dihydrocytosine compound having the formula

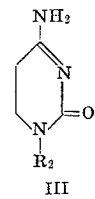

III or a salt thereof with a halogenating agent, preferably in the presence of a base, such as an alkali metal alkoxide, in an unreactive solvent medium; where $R_2$ is lower alkyl or benzyl. This method is best adapted for the preparation of the 1-substituted-5-bromo starting materials, by reacting a compound of Formula III with bromine or N-bromosuccinimide, and of the 1-substituted-5-iodo starting materials, by reacting III with iodine. These starting materials are normally prepared and isolated as such prior to use in the dehydrohalogenation reaction, but they can also be prepared in situ and used further without isolation. For example, when dehydrohalogenation is accomplished by heating in nitrobenzene solution at 150–170° C., a hydrohalide salt of the 5,6-dihydrocytosine compound of Formula III above is reacted with bromine in nitrobenzene solution at a temperature above 100° C., and the resulting solution, containing a 5-bromo-5,6-dihydrocytosine salt intermediate is heated to 150–170° C. until dehydrohalogenation is complete. This method is best suited to those cases wherein the substituent $R_2$ in Formula III is lower alkyl.

The 5-chloro-5,6-dihydrocytosine starting compounds are not readily prepared by direct chlorination of a 5,6-dihydrocytosine compound of Formula III. These starting materials are best prepared as follows. 2-Chloroacrylonitrile is reacted with an amine having the formula

to give a 3-amino-2-chloropropionitrile compound having the formula

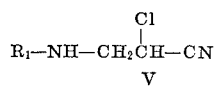

which, in acid-addition salt form, is reacted with cyanic acid (conveniently generated in situ from an alkali metal cyanate), and the resulting 1-(2-chloro-2-cyanoethyl)urea compound having the formula

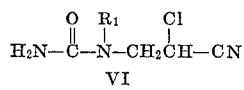

is reacted with a strong acid, such as hydrogen chloride, in an unreactive solvent medium to give an acid-addition salt of the desired 5-chloro-5,6-dihydrocytosine starting compound. The acid-addition salt can then be converted to the free base 5-chloro-5,6-dihydrocytosine compound by reaction with excess base. In the foregoing formulas, $R_1$ has the aforementioned significance.

The method of preparation of the 5,6-dihydrocytosine compounds having Formula III above is described in our co-pending application Ser. No. 476,694, filed Aug. 2, 1965, now U.S. Pat. 3,375,247.

As stated in the foregoing, the 5-halo-5,6-dihydrocytosine compounds having Formula II can be used in the dehydrohalogenation process in either free base or salt form. Acid-addition salts of these 5-halo-5,6-dihydrocytosine compounds are prepared as already indicated or by reaction with any of a number of inorganic or organic acids, including hydrochloric, hydrobromic, hydriodic, nitric, sulfuric, phosphoric, sulfonic, acetic, benzoic, maleic, citric, succinic, oxalic, and picric acids.

The 1-substituted cytosine compounds that are produced by the dehydrohalogenation process of the invention are useful as chemical intermediates. As such, they can be reacted with an acylated sulfanilyl chloride, such as N-acetylsulfanilyl chloride, to produce an acylated N-sulfanilylcytosine compound, which in turn can be hydrolyzed to produce an N-sulfanilylcytosine compound having the formula

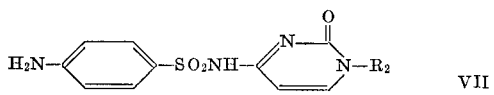

where $R_2$ is a previously defined; as more fully described in the aforementioned co-pending application Ser. No. 476,694.

The unsubstituted product of the process of the invention, cytosine, is also useful as a chemical intermediate. It can be used, for example, in the preparation of cytidine, according to the method described in J. Am. Chem. Soc., vol. 79, pages 5060–5064, 1957, which in turn can be used to prepare the known antitumor and antiviral agent, 1-β-D-arabinosylcytosine (ara-C). The synthesis and pharmacological properties of ara-C have been described in Progress in Nucleic Acid Research and Molecular Biology, vol. 5, Academic Press Inc., New York, N.Y., 1966, pages 11–12 and 54–59.

The invention is illustrated by the following examples.

Example 1

To a stirred solution of 6.53 g. of potassium hydroxide in 135 ml. of absolute methanol, cooled initially to 5° C., is added 22.0 g. of 5-bromo-1-ethyl-5,6-dihydrocytosine, and the resulting mixture is stirred without external cooling or heating until the internal temperature reaches a maximum (about 35° C.) and begins to drop. The reaction mixture is next stirred and heated under reflux for 5–10 minutes, then allowed to cool to room temperature, and is evaporated to dryness under reduced pressure at an external temperature below 80° C. The solid residue is treated with 23.1 ml. of water, and the aqueous mixture is stirred and heated at 80° C. until a clear solution is obtained. The aqueous solution is cooled rapidly to room temperature and then further cooled at about 0° C. overnight. The 1-ethylcytosine that precipitates is isolated by filtration, washed twice with 1–2 ml. portions each of ice-cold water, dried, and washed again with 60 ml. of ether. Following two crystallizations from either ethanol or water, the 1-ethylcytosine has M.P. 245–247° C. (with decomposition).

In the foregoing procedure, the same product is obtained when the potassium hydroxide is replaced by an equivalent amount of any of the following: sodium hydroxide, sodium methoxide, anhydrous triethylamine, or anhydrous pyridine.

Utilizing the foregoing general procedure, the following 1-lower alkyl-cytosine compounds can be obtained from the dehydrobromination of the designated 5-bromo-1-lower alkyl-5,6-dihydrocytosines:

(a) 1-methylcytosine; from dehydrobromination of 5-bromo-1-methyl-5,6-dihydrocytosine.
(b) 1-butylcytosine; from dehydrobromination of 5-bromo-1-butyl-5,6-dihydrocytosine.

The preparation of the 5-bromo-1-lower alkyl-5,6-dihydrocytosines can be illustrated by the preparation of 5-bromo-1-ethyl-5,6-dihydrocytosine as follows. A mixture consisting of 14.1 g. of 1-ethyl-5,6-dihydrocytosine, 13.8 ml. of triethylamine, and 100 ml. of absolute methanol is stirred and cooled to 0° C. while 15.98 g. of bromine is added over a period of 4–5 minutes at such a rate so that the internal temperature is maintained at 0±3° C. The cooling bath is removed and the reaction mixture is stirred without external heating or cooling for about 15–20 hours overnight. During the first 30 minutes, the reaction is exothermic and the mixture reaches a temperature of 34° C. At the end of this period the mixture is cooled in an ice-water bath and the solid 5-bromo-1-ethyl-5,6-dihydrocytosine that is precipitated is isolated, washed sparingly with cold methanol and with ether, and dried; M.P. 140–146° C. At this temperature the 5-bromo-1-ethyl-5,6-dihydro cytosine melts and then, upon further heating, undergoes thermal reaction to give 1-ethylcytosine hydrobromide, which forms as a solid in the melt and which in turn melts at 198–206° C.

The 5-bromo-1-ethyl-5,6-dihydrocytosine can also be prepared as follows. Equivalent amounts of 1-ethyl-5,6-dihydrocytosine and N-bromosuccinimide are dissolved in anhydrous methanol, and the resulting solution is kept at room temperature overnight. It is then cooled in an ice-water bath, and the solid product is isolated, washed sparingly with cold methanol and with ether, and dried under reduced pressure at 60° C.

The 5-bromo-1-methyl-5,6-dihydrocytosine and 5-bromo-1-butyl-5,6-dihydrocytosine starting materials can be prepared similarly by reacting 1-methyl-5,6-dihydrocytosine and 1-butyl-5,6 - dihydrocytosine, respectively, with bromine or with N-bromosuccinimide.

Example 2

A mixture consisting of 13.4 g. of 1-ethyl-5-iodo-5,6-dihydrocytosine, 3.3 g. of potassium hydroxide, and 67 ml. of absolute methanol is stirred and heated under reflux for 10–15 minutes and then evaporated to dryness under reduced pressure. The solid residue is dissolved in 35 ml. of hot water, and the resulting solution is treated with a small amount of sodium sulfite and cooled briefly. The precipitated inorganic salts are removed by filtration, and the filtrate is cooled further for an additional 24 hours or longer to give 1-ethylcytosine; M.P. 245–246.7° C., following successive crystallizations from absolute ethanol (with charcoal treatment) and acetonitrile.

The 1-ethyl-5-iodo-5,6-dihydrocytosine starting material is prepared as follows. To a stirred methanolic solution of sodium methoxide (prepared by dissolving 2.3 g. of sodium in 100 ml. of absolute methanol) is added 14.1 g. of 1-ethyl-5,6-dihydrocytosine and the mixture is stirred until a clear solution is obtained. The stirred solution is then cooled externally to 0° C., 25.38 g. of finely-ground iodine is added, the cooling bath is removed, and the reaction mixture is stirred without external heating or cooling overnight. During the first hour, the reaction is exothermic and the mixture reaches a temperature of 34° C. At the end of this stirring period, the mixture is filtered at room temperature, and the solid 1-ethyl-5-iodo-5,6-dihydrocytosine that is isolated is washed with a small amount of fresh methanol and with ether and dried. This somewhat impure product has M.P. 161–162° C. (with decomposition), and is suitable for use above without further purification.

Example 3

To a solution of 88.8 g. of 1-ethyl-5,6-dihydrocytosine hydrobromide in 200 ml. of nitrobenzene at 174° C. is added 22.6 ml. of bromine over a period of 8 minutes, and the mixture is kept at 170–175° C. until hydrogen bromide evolution ceases (about 15 minutes). Upon cooling there is obtained crude 1-ethylcytosine hydrobromide, which is isolated, washed with water, and dried; M.P. 170–187° C. This salt is heated at 90–100° C. with 70 ml. of N,N-dimethylformamide and 60 ml. of piperidine, and the resulting solution is chilled to give 1-ethylcytosine, essentially identical with that obtained as described in the previous examples.

Example 4

To a stirred solution of 2.22 g. of potassium hydroxide in 23 ml. of absolute methanol is added, in one portion, 3.61 g. of 5-chloro-1-ethyl-5,6-dihydrocytosine hydrochloride, and the resulting mixture is stirred and heated under reflux for 5–10 minutes, allowed to cool slowly to room temperature, and evaporated to dryness at 60° C., under reduced pressure. The solid residue is washed, first with three 2-ml. portions of cold water, then with one 3-ml. portion of cold ethanol, dried, and dissolved in 6 ml. of water at 85° C. The hot aqueous solution is treated with charcoal, filtered, and the filtrate is cooled in an ice-water bath. The solid that precipitates is collected on a filter, washed with one 1-ml. portion of cold water, with one 1.5-ml. portion of cold absolute ethanol and with a small amount of ether, and dried. It is 1-ethylcytosine, identical with that obtained as described in the previous examples.

The 5-chloro-1-ethyl-5,6-dihydrocytosine hydrochloride starting material is prepared as follows.

To a stirred solution of 6.38 ml. of ethylamine in 50 ml. of acetonitrile, cooled to −20° C., is added 8.04 ml. of α-chloroacrylonitrile while the temperature of the reaction mixture is maintained below 10° C. The mixture is then cooled to 0° C., made slightly acid (pH 6) by the addition of 46.5 ml. of 2 N aqueous hydrochloric acid, and the acidic solution is evaporated to dryness. The solid resiude obtained, which is 2-chloro-3-ethylaminopropionitrile hydrochloride, is purified by successive crystallizations from absolute ethanol and from acetonitrile (with charcoal treatment); M.P. 158–159° C.

To a stirred solution of 16.9 g. of 2-chloro-3-ethylaminopropionitrile hydrochloride in 30 ml. of water, cooled in an ice-water bath, is first added about 1 g. of Dry Ice and then 8.27 g. of potassium cyanate. The resulting mixture is stirred briefly until a clear solution is obtained, the cooling bath is then removed, and the reaction mixture is allowed to warm to 15° C. with continued stirring. The mixture is kept at 12–15° C. for one hour more, and is then stored at 0° C. overnight. The solid that precipitates during this period is isolated, washed with two 5-ml. portions of ice-cold water and dried under reduced pressure over phosphorus pentoxide. It is 1-(2-chloro-2-cyanoethyl)-1-ethylurea, which may be purified by crystallization from cold aqueous acetone; M.P. 90–90.6° C. Heating during crystallization should be avoided since this intermediate product is unstable above room temperature. It is likewise unstable upon extended storage at room temperature, and should be reacted further without undue delay.

Dry hydrogen chloride (4.5 g.) is bubbled into 20 ml. of dry acetonitrile, cooled to 0° C., and to the resulting cold solution is added 3.51 g. of 1-(2-chloro-2-cyanoethyl)-1-ethylurea. After thorough mixing, the resulting solution is allowed to warm to 30° C., kept at room temperature for 2 days, and then cooled to 0° C. and filtered. The solid obtained, which is the desired 5-chloro-1-ethyl-5,6-dihydrocytosine hydrochloride, is washed with two 5-ml. portions of cold dry acetonitrile and with several small portions of ether, and dried under reduced pressure over potassium hydroxide; M.P. 210° C. (with decomposition).

The hydrochloride salt is converted to the free base as follows. The salt (2.0 g.) is stirred well with a solution of 2 ml. of triethylamine in 20 ml. of absolute methanol, and the resulting mixture is filtered. The solid 5-chloro-1-ethyl-5,6-dihydrocytosine free base that is isolated on the filter is washed successively with 15 ml. of water, a small amount of cold ethanol, and a small amount of ether, and dried; M.P. 180–184° C. (with decomposition), following crystallization from absolute ethanol.

Example 5

A mixture of 86.35 g. of 1-benzyl-5-bromo-5,6-dihydrocytosine and 250 ml. of N,N-dimethylformamide is stirred and heated to 115° C., and to the resulting solution, with continued stirring, is added 90 ml. of triethylamine at such a rate as to maintain gentle reflux. The mixture is then cooled slowly to 5° C. and filtered. The solid obtained is washed well with three 200-ml. portions of water, with 30 ml. of cold absolute ethanol, and with 30 ml. of ether, and dried. It is 1-benzylcytosine; M.P. 296–298° C. (with decomposition), following crystallization from 75% aqueous N,N-dimethylformamide.

The starting material is prepared as follows. To a stirred methanolic solution of sodium methoxide (prepared by dissolving 9.38 g. of sodium in 250 ml. of absolute methanol) is added 81.3 g. of 1-(2-cyanoethyl)-1-benzylurea, and the resulting solution is stirred and heated under reflux for 7 minutes. The reaction mixture, now containing 1-benzyl-5,6-dihydrocytosine, is next cooled to −10° C. and stirred again while 66.5 g. of bromine is added over a 10-minute period at such a rate so that the temperature does not rise above −10° C. After bromine addition is complete, the resulting mixture is slowly heated to the reflux temperature and kept there for one minute. It is then cooled to about 0° C. and the 1-benzyl-5-bromo-5,6-dihydrocytosine that precipitates is isolated, washed with a small amount of cold methanol and ether, and dried under reduced pressure at 60° C. It has M.P. 147° C., and is suitable for use without further purification. At 147° C., this product melts and then, upon further heating, undergoes thermal reaction to give 1-benzylcytosine hydrobromide, which forms as a solid in the melt and which in turn melts at 274° C.

Example 6

To a stirred solution of 0.973 g. of potassium hydroxide in 18.5 ml. of absolute ethanol is added 2 g. of 5-chloro-5,6-dihydrocytosine, and the resulting mixture is heated under reflux for 20 minutes and then evaporated to dryness under reduced pressure at 50° C. The solid residue is stirred with 10 ml. of cold water and isolated by filtration. It is cytosine, purified by first washing with two 1-ml. portions of cold water, with 2 ml. of cold ethanol, and with a small amount of anhydrous ether, and then crystallizing from water (with charcoal treatment); M.P. 312.5–315° C. (with decomposition).

The 5-chloro-5,6-dihydrocytosine starting material is prepared as follows.

A methanolic ammonia solution is prepared by bubbling 47.0 g. of anhydrous ammonia into 400 ml. of absolute methanol, cooled to about −20° C., and to the resulting solution at 0–2° C. is added with stirring 32.2 ml. of α-chloroacrylonitrile. After five minutes, the cooling bath is removed, and the mixture is stirred for 15 minutes more and then concentrated under reduced pressure below room temperature to a volume of about 200 ml. The concentrated solution is next cooled to −45° C. and made acidic by the addition of 36 ml. of a cold (−30° C.) solution of anhydrous hydrogen chloride (8.95 g.) in methanol. To the cold acidic mixture is added, with vigorous stirring, 700 ml. of anhydrous ether, and the ethereal mixture is stirred at 0° C. for 90 minutes. If necessary, some seed crystals of the desired α-chloro-β-aminopropionitrile hydrochloride product, prepared in small test tube trials, are added at this point to induce crystallization of the oily precipitate. The precipitated solid α-chloro-β-aminopropionitrile hydrochloride is isolated, washed with ether, and dried; M.P. 153.5–155° C., following crystallization from methanol.

Into a stirred mixture consisting of 24.7 g. of α-chloro-β-aminopropionitrile hydrochloride, 0.5 g. of sodium bicarbonate, and 52.5 ml. of water, cooled to about 2° C., is passed gaseous carbon dioxide for a period of 5 minutes. Potassium cyanate (14.5 g.) is then added and stirring is continued for 4 hours while the temperature of the reaction mixture is kept at 5–8° C. The reaction with potassium cyanate is initially exothermic and a small amount (about 1 g.) of Dry Ice is added to keep the temperature below 8° C. After storage overnight at 0° C., the mixture is extracted with three 60-ml. portions of ethyl acetate, and the combined extracts are dried and evaporated to dryness. The syrupy residue obtained slowly crystallizes (seeding may be required) to give 1-(2-chloro-2-cyanoethyl)urea, which is isolated and dried; M.P. 58.3–60° C., suitable for use without further purification.

A cold (4° C.) solution of 23.6 g. of anhydrous hydrogen chloride in 122 ml. of dry acetonitrile is added to 17.93 g. of 1-(2-chloro-2-cyanoethyl)urea, and the resulting mixture is stirred gently without external cooling or heating until a maximum temperature (about 28° C.) is reached. It is then kept at room temperature for 2–3 days, cooled with stirring in an ice-water bath for two hours, and filtered to give 5-chloro-5,6-dihydrocytosine hydrochloride, which is washed with a small amount of cold acetonitrile and with ether, and dried; M.P. 182–183° C. (with decomposition). This hydrochloride salt is converted to the free base as follows. The salt (5.53 g.) is added at room temperature to a stirred solution of 5.0 ml. of triethylamine in 25 ml. of absolute methanol, and after a short period of continued stirring, the resulting mixture is cooled in an ice-water bath for 2 hours and filtered. The solid obtained is washed with two 3.5-ml. portions of cold methanol and with ether, and dried. It is the desired 5-chloro-5,6-dihydrocytosine; M.P. 177–178° C. (with decomposition), following crystallization from absolute methanol (with charcoal treatment).

We claim:
1. A member of the class consisting of 5-halo-5,6-dihydrocytosine compounds having the formula

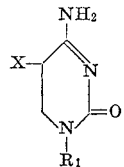

and acid-addition salts thereof formed with strong acids; where $R_1$ is a member of the class consisting of hydrogen, lower alkyl, and benzyl, and X is a halogen selected from among bromine, chlorine, and iodine.

2. A compound according to claim 1 which is 5-bromo-1-ethyl-5,6-dihydrocytosine.

3. A compound according to claim 1 which is 1-ethyl-5-iodo-5,6-dihydrocytosine.

4. A compound according to claim 1 which is 5-chloro-1-ethyl-5,6-dihydrocytosine.

5. A compound according to claim 1 which is 5-chloro-5,6-dihydrocytosine.

6. A compound according to claim 1 which is 5-chloro-1-ethyl-5,6-dihydrocytosine hydrochloride.

References Cited

Cheng et al.: J. Heterocyclic Chem., 1 (5), 260-2 (1964).

Wagner et al.: Synthetic Organic Chemistry, John Wiley & Sons, 1953, pp. 35–8.

ALEX MAZEL, Primary Examiner

R. J. GALLAGHER, Assistant Examiner

U.S. Cl. X.R.

260—239.75, 465.4, 465.5